No. 862,447. PATENTED AUG. 6, 1907.
W. W. CHRISTY.
NUT LOCK.
APPLICATION FILED JAN. 11, 1906.

Witnesses
Jas. A. Koell.
C. W. Griesbauer

Inventor
W. W. Christy.
by H. B. Wilson
Attorney

UNITED STATES PATENT OFFICE.

WILLIAM W. CHRISTY, OF WASHINGTON TOWNSHIP, BUTLER COUNTY, PENNSYLVANIA, ASSIGNOR OF ONE-HALF TO SAMUEL S. ATWELL, OF BUTLER, PENNSYLVANIA.

NUT-LOCK.

No. 862,447.  Specification of Letters Patent.  Patented Aug. 6, 1907.

Application filed January 11, 1906. Serial No. 295,646.

*To all whom it may concern:*

Be it known that I, WILLIAM W. CHRISTY, a citizen of the United States, residing at Washington township, in the county of Butler and State of Pennsylvania, have invented certain new and useful Improvements in Nut-Locks; and I do declare the following to be a full, clear, and exact description of the invention, such as will enable others skilled in the art to which it appertains to make and use the same.

This invention relates to improvements in nut locks.

The object of the invention is to provide a bolt and nut having applied thereto a locking device which when arranged in place will securely hold the nuts against movement from vibration or friction, means being provided whereby the locking mechanism may be readily removed to permit the unscrewing of the nuts.

With the above and other objects in view, the invention consists of certain novel features of construction, combination and arrangement of parts, as will be hereinafter described and claimed.

Figure 1:
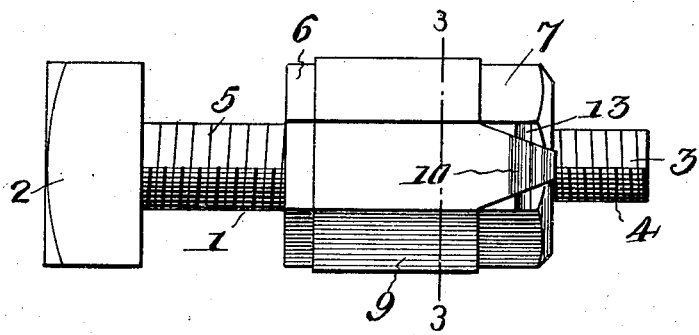
Figure 2:
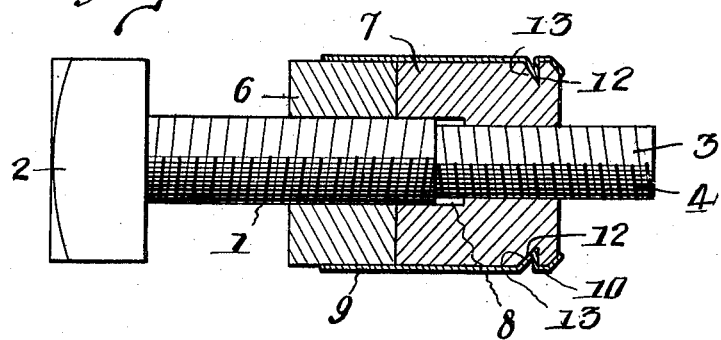
Figure 3:
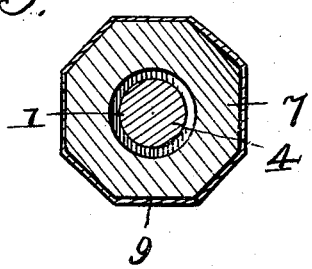

In the accompanying drawings:—Figure 1 is a side view of the bolt and nuts constructed in accordance with the invention, and showing the application of the locking device thereto; Fig. 2 is a longitudinal sectional view of the bolt and nuts taken through the spring metal securing devices which hold the lock in place on the nuts; and Fig. 3 is a transverse sectional view through the nut and bolt, taken on the line 3—3 of Fig. 1.

Referring more particularly to the drawings, 1 denotes the bolt having on one end a head 2. The bolt 1 is provided with a reduced outer end portion 3, on which is formed right-hand threads 4, while on the large or head end portion of the bolt is formed left-hand screw threads 5.

Adapted to be screwed upon the left-hand threaded portion of the bolt is a nut 6 while upon the reduced right-hand threaded portion of the bolt is adapted to be screwed an elongated nut 7. In the inner end of the latter is formed an enlarged annular recess 8 which when the nut 7 is screwed upon the bolt and into engagement with the nut 6 will provide space to allow the nut 7 to be screwed into tight engagement with the nut 6 and to permit the inner end of said nut 7 to project over the enlarged threaded portion of the bolt, as shown.

The nuts 6 and 7 may be of any suitable conformation, but are here shown as being octagonal in shape, and onto the same is adapted to be placed a similarly shaped locking sleeve 9. This sleeve is slipped upon the nuts in such position that a portion of both nuts are engaged thereby, thus not permitting the turning of one nut without the other, and as said nuts are screwed upon threads running in the opposite direction, it is obvious that the same will be positively locked against back threading or unscrewing after the same have been properly adjusted or screwed upon the bolt against the object to which the latter is applied. In order that the locking sleeve 9 will be held against slipping on the nuts 6 and 7, said sleeve is provided with oppositely disposed outwardly projecting spring metal tongues 10 which are preferably formed integral with said sleeve. The outer ends of the tongues 10 are provided with inwardly projecting lugs or bent portions 12 which when the sleeve is slipped upon the nuts will spring into notches or grooves 13 formed in the sides of the outer nut 7, thereby preventing the casual removal or slipping off of the sleeve but permitting ready removal of the same when desired. The tongues are elongated, preferably of a substantially triangular shape, whereby the lugs or bent portions, 12, are easily formed in the narrow portion and the tips extend beyond the face of the outer nut to permit of their being readily grasped to lift the lugs out of the recesses when it is desired to remove the sleeve.

A bolt and nut constructed and locked as herein shown and described may be safely employed in connection with railway rails, bridge constructions, machinery, vehicles and in any place where the same is subjected to great vibration, jarring or friction.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim as new and desire to secure by Letters-Patent, is:—

In a nut lock, a bolt having its outer end formed of two diameters and provided with oppositely inclined screw threads, two nuts thereon, the outer nut being provided with a perforation of two diameters and having its exterior provided with recesses adjacent to its outer face, the smaller portion of the perforation being screw threaded to fit the smaller part of the bolt and the larger portion being smooth and adapted to pass over the larger part of the bolt, and a sleeve on said nuts, the forward edge of which is provided with forwardly extending, or elongated, substantially triangular tongues, the ends of which extend beyond the outer face of the outer nut and are each provided with a bent portion for engaging with one of said recesses.

In testimony whereof I have hereunto set my hand in presence of two subscribing witnesses.

WILLIAM W. CHRISTY.

Witnesses:
CHAS. H. MILLER,
SAMUEL S. ATWELL.